(12) United States Patent
Clemenzi et al.

(10) Patent No.: US 11,802,845 B2
(45) Date of Patent: Oct. 31, 2023

(54) ADVANCED GROUND THERMAL CONDUCTIVITY TESTING

(71) Applicant: Richard A Clemenzi, Asheville, NC (US)

(72) Inventors: Richard A Clemenzi, Asheville, NC (US); Garen N Ewbank, Fairview, OK (US); Judith A Siglin, Asheville, NC (US)

( * ) Notice: Subject to any disclaimer, the term of this patent is extended or adjusted under 35 U.S.C. 154(b) by 0 days.

(21) Appl. No.: 17/133,470

(22) Filed: Dec. 23, 2020

(65) Prior Publication Data

US 2022/0196583 A1 Jun. 23, 2022

(51) Int. Cl.
*G01N 25/18* (2006.01)
*G01F 1/66* (2022.01)

(52) U.S. Cl.
CPC ............ *G01N 25/18* (2013.01); *G01F 1/662* (2013.01)

(58) Field of Classification Search
CPC .............................. G01N 25/18; G01F 1/662
See application file for complete search history.

(56) References Cited

U.S. PATENT DOCUMENTS

| | | | | |
|---|---|---|---|---|
| 4,937,052 A * | 6/1990 | Takahashi | ............... | F24T 10/20 166/57 |
| 8,851,746 B2 * | 10/2014 | Collins | ................... | G01N 25/18 106/713 |
| 11,454,092 B2 * | 9/2022 | Quazi | ................... | E21B 36/006 |
| 2007/0023164 A1 * | 2/2007 | Kidwell | ................... | F28F 13/12 165/45 |
| 2011/0220320 A1 * | 9/2011 | Kidwell | ................... | F24T 10/17 165/45 |
| 2014/0014341 A1 * | 1/2014 | Hathcox | ............... | C04B 28/184 166/292 |
| 2019/0086345 A1 * | 3/2019 | Clemenzi | ............. | G01N 25/005 |
| 2020/0011821 A1 * | 1/2020 | Zhang | .................... | G01N 25/18 |
| 2022/0196583 A1 * | 6/2022 | Clemenzi | ................ | G01F 1/662 |
| 2022/0256711 A1 * | 8/2022 | Xiao | ........................ | H01L 25/04 |

FOREIGN PATENT DOCUMENTS

| | | | | |
|---|---|---|---|---|
| CN | 116011614 A | * | 4/2023 | |
| WO | WO-2017156314 A1 | * | 9/2017 | .............. F24T 10/15 |
| WO | WO-2022060913 A2 | * | 3/2022 | |
| WO | WO-2022194951 A1 | * | 9/2022 | |

OTHER PUBLICATIONS

Xiaobing Liu/Richard A. Clemenzi/Liu Su, "Advanced Testing Method for Ground Thermal Conductivity", U.S. DOE Oak Ridge National Lab report ORNL/TM-2017/208, Apr. 2017, USA (submitted with IDS).

Rick Clemenzi/Xiaobing Liu/Garen Ewbank/Judy Siglin, "Thermal Response Testing Takes A Step Forward", GeoOutlook, 2017 Q3, pp. 22-27, vol. 14 No. 3, International Ground Source Heat Pump Association, Stillwater, OK, USA (submitted with IDS).

* cited by examiner

*Primary Examiner* — Manuel A Rivera Vargas
*Assistant Examiner* — Yaritza H Perez Bermudez

(57) ABSTRACT

Determination of Ground Thermal Conductivity (TC) in the field of Geothermal Heat Pumps (GHPs). The invention provides a simple mathematical approach using minimal terms with apparatus not dependent on stable electric power generation.

19 Claims, 19 Drawing Sheets

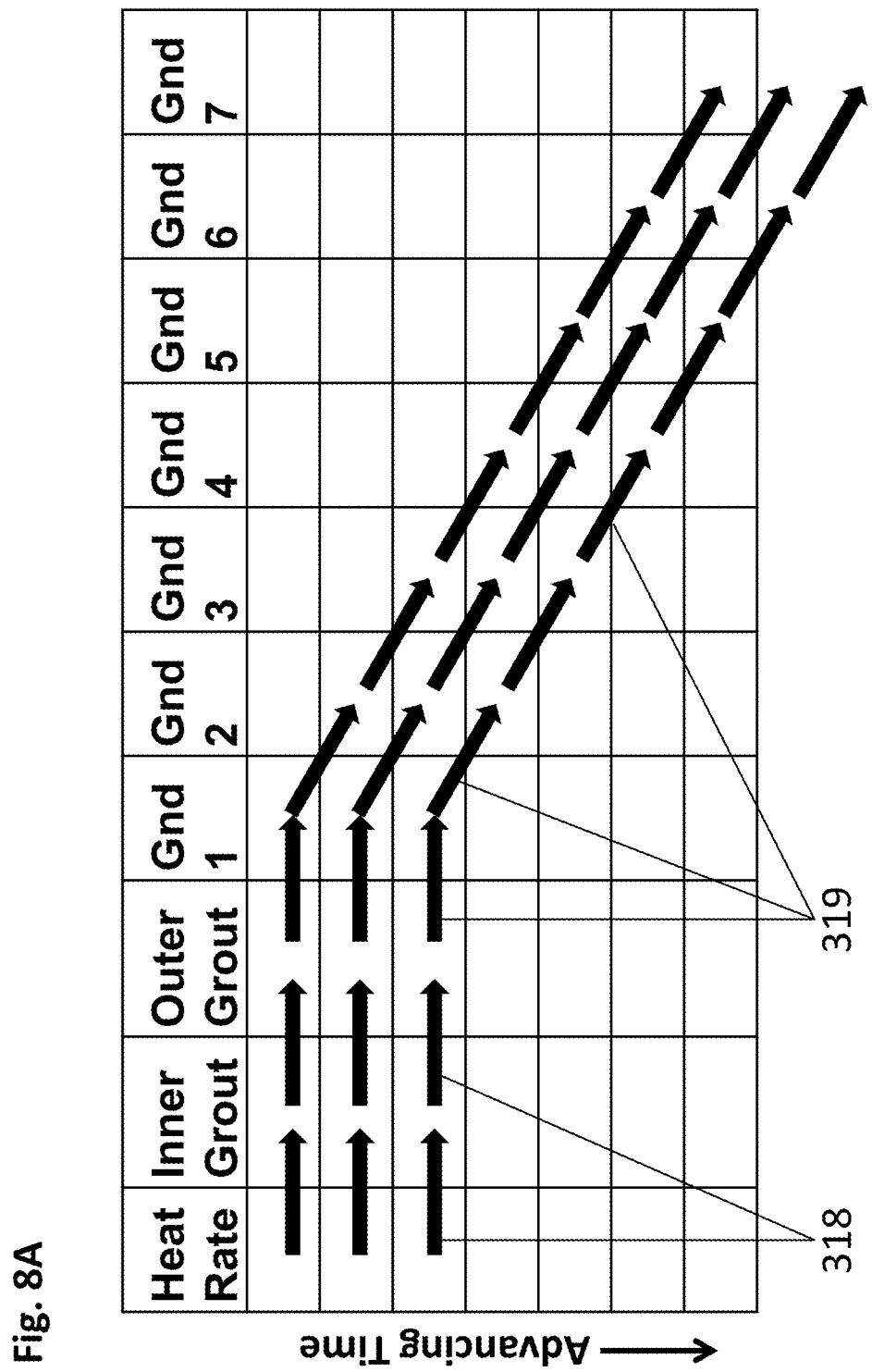

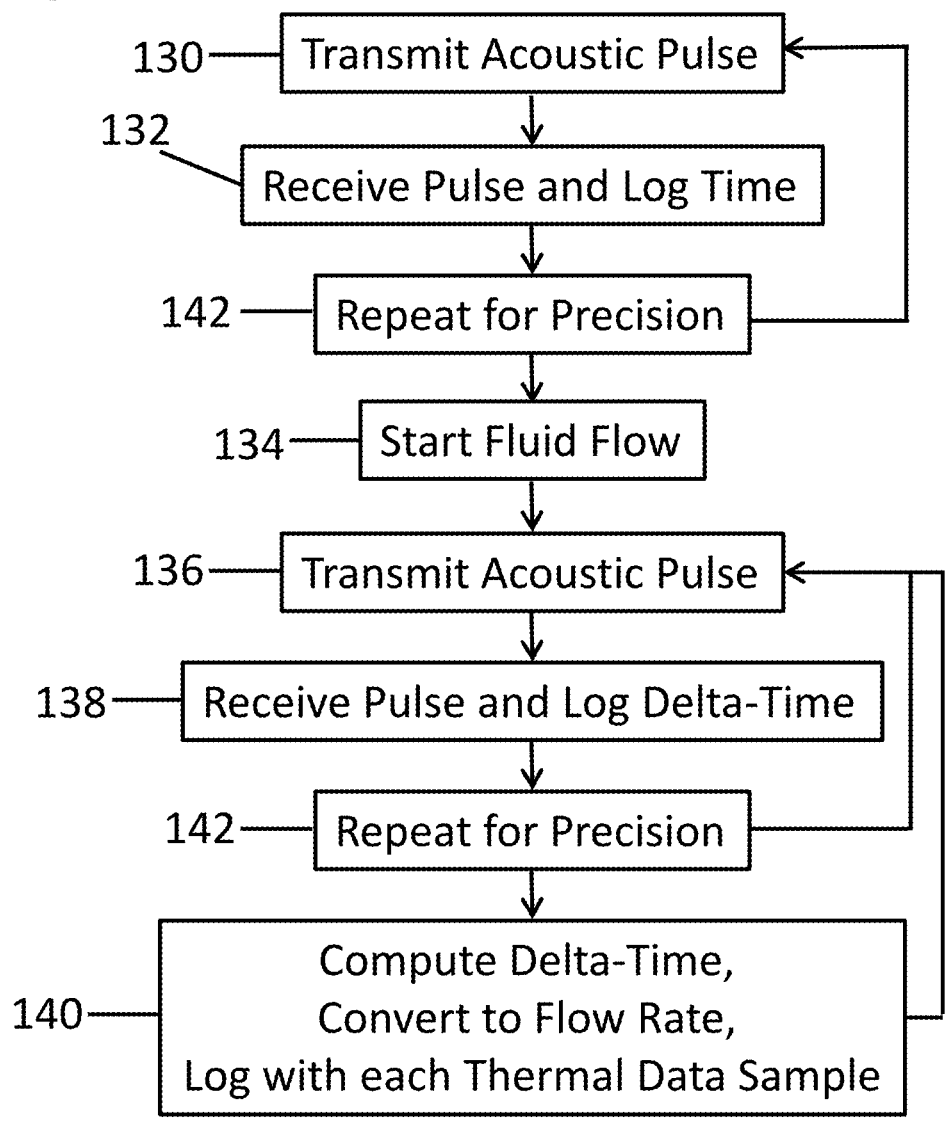

Fig. 15

$$\text{HR} \rightarrow {}^\circ\text{F}: \quad \frac{\text{HR}}{\text{HC} * \text{Mass}} = \Delta T \qquad 500$$

$${}^\circ\text{F} \rightarrow \text{HR}: \quad \Delta T * \text{TC} * \text{Area} = \text{HR} \qquad 502$$

ADVANCED GROUND THERMAL CONDUCTIVITY TESTING

STATEMENT REGARDING FEDERALLY SPONSORED RESEARCH OR DEVELOPMENT

This invention was made in part under a CRADA (No. NFE-16-06144) between Geothermal Design Center Inc. and Oak Ridge National Laboratory operated for the United States Department of Energy. The Government has certain rights in this invention.

CROSS-REFERENCE TO RELATED APPLICATIONS

This is a continuation-in-part of and the benefit is claimed of U.S. patent application Ser. No. 16/083,507 filed 9 Sep. 2018; which in turn claims the benefit of PCT patent application Ser. No. PCT/US17/21644 filed 9 Mar. 2017 and U.S. provisional patent application Ser. No. 62/305,907 filed 9 Mar. 2016. The entire disclosures of application Ser. No. 16/083,507 and PCT/US17/21644 and 62/305,907 are hereby incorporated by reference.

BACKGROUND OF THE INVENTION

This invention pertains to the field of Geothermal Heat Pumps (GHPs) and determination of Ground Thermal Conductivity (TC).

A Thermal Response Test (TRT) is used to determine the Thermal Conductivity (TC) of the earth for Geothermal Heat Pump (GHP) systems. This TRT involves installation of a water loop, usually into a well bore, backfilling the area around the loop, heating the water in the loop while circulating it with a pump, and recording the Temperature (T) of the outgoing and returning water as well as the Heat Rate (HR) and Flow (F) rates. The backfilling is often with a specifically engineered "grout" product the TC of which is also of importance in a GHP system.

Correctly determining TC is a critical requirement for designing a cost-effective and fully functional GHP loopfield. The current method requires extremely clean electric power to produce the heat input which is generally only available using a large diesel generator on a trailer that is expensive to rent and operate. Further, current TRT requires approximately a full 48 hours of testing to achieve the results needed, although some (U.S. Pat. No. 8,005,640) have suggested TRT completion in less than 36 hours using heat pulses. All prior efforts expect a very stable and easily measured heat rate which significantly limits the possible heat sources.

The recorded supply and return temperatures of the fluid in the loop, the measured flow rate, and the precise heat input rate are the principal inputs for analysis. These are currently then graphed on a log(time) scale and a straight line fit in the final 24 hours to obtain the very important TC result. This existing method is reported to have a +/−15% accuracy, and field testing of multiple TRTs within a 2-block radius has confirmed the relatively low accuracy of the current method.

The second important and needed physical property of the ground is Heat Capacity (HC) which currently is only subjectively estimated from the drilling log based on the rock materials identified and reported. Heat Capacity together with TC is used to generate a number for the "Thermal Diffusivity" of the ground which is an input into GHP loopfield design software. Sometimes "Diffusivity" is instead estimated directly from the well log leaving HC to be calculable if desired. (Note: Thermal Conductivity and Heat Capacity are the only physical properties involved, with Thermal Diffusivity being a calculated parameter based on those physical properties.)

Also, the existing TRT method completely ignores the data collected that is associated with heating of the grouted borehole where the fluid pipe is installed. Thus it produces no useful output about the grout or borehole.

The current TC analysis protocol has several limiting factors including a lack of mathematical dimensionality and the use of a log calculation on time which reduces resolution. By depending on a single dimension curve fit (i.e., straight line) and further doing so after reducing resolution on the time axis by using a log scale, the current TC analysis absolutely eliminates any valid analysis with an unstable, varying heat power source. Further, no effort is made to empirically determine the critically important Heat Capacity property of the ground, and data for the first ¼ of the test period is essentially discarded which precludes any confirmation of the installed loop pipe or determination of the actual as installed grout TC or HC. Poor quality grouting is a major issue in this field, and this limitation against determining grout TC or HC is a significant limitation of the current TRT methods.

SUMMARY OF THE INVENTION

In overview, the invention provides a simple mathematical approach using minimal terms. Previous approaches have used finite element analysis (which is highly computational).

In one aspect, there is provided apparatus for conducting a Thermal Response Test (TRT) to determine Thermal Conductivity (TC) and Heat Capacity of ground using a fluid pipe loop inserted into the ground and having a fluid outgoing side and a fluid return side. The apparatus includes a fluid flow measurement device; a heat source; temperature sensors in the outgoing and returning sides; and a computational device executing a program for inputting and recording temperature and flow data, running a simulation based on a minimal parameter model, and correlating the simulation results to the data.

In another aspect, there is provided a process for accurately determining Thermal Conductivity (TC) and Heat Capacity (HC) of both the Grout, if installed, and Ground surrounding an installed Geothermal Heat Pump fluid ground loop. The process includes the steps of building a mathematical model of the pipe type and length, borehole diameter, and Thermal Conductivity and Heat Capacity of the grout and ground being tested; enabling a circulating pump and thermal source affecting the fluid loop; recording time-stamped data including outgoing and returning fluid loop temperatures, flow rate of the fluid, and heat flux input by the thermal source; performing a time-stepping simulation using the mathematical model and comparing that to the measured actual thermal energy input into the fluid loop; determining a best fit solution for all Thermal Conductivity and Heat Capacity parameters such that the model matches the time-stamped data to a high degree of significance, and reporting the resulting parameters; where the model includes inputs for pipe sizes, pipe lengths, pipe configuration, and borehole diameters if in a borehole; the model does not depend on the quality of thermal energy being supplied; the model contains no more than one thermal zone each of grout inside and outside the loop if grout is present, one or more thermal zones for ground extending outward from the pipe, and one thermal conduction path between each adjacent thermal zone; and the simulation is run entirely on an embedded microprocessor computational in real-time with limited memory and only basic mathematical capabilities. The ground zone formulation is actually only one computation device but repeated going outward from the pipe to model heat transfer over advancing time.

In another aspect, there is provided a process for determining the minimum amount of time and thus cost needed for a Thermal Response Test for a Geothermal Heat Pump fluid ground loop using a log of time scale straight line fit method of determining Ground Thermal Conductivity based on a statistical criteria. The process includes starting loop pumping and a reliable heat flux input to the loop, and collecting ground loop outgoing and returning thermal data until the incremental change in thermal data falls below a pre-determined level, and labeling that as the "cutting time" being the starting point for the final Ground Thermal Conductivity computation; collecting another set of ground loop outgoing and returning fluid loop thermal data points; computing and saving the Ground Thermal Conductivity based on the collected thermal data points from the "cutting time" to the last collected sample using the log of time scale straight line fit method; calculating the standard deviation 1 and the relative variation 2 of the saved computed Thermal Conductivity values; terminating the test and reporting the last saved Thermal Conductivity result if predetermined statistical significance criteria for 1 and 2 are satisfied or if a predetermined maximum amount of time has passed; and repeating the process from step B until terminated.

In yet another aspect, there is provided a process for determining the quality and any non-constant thermal transfer properties within the ground of a Thermal Response Test for a Geothermal Heat Pump and fluid ground loop using a running average on a fixed interval of thermal data and thermal conductivity as determined by the log of time scale straight line fit method. The process includes collecting loop outgoing and returning thermal data samples and computing and storing the log of time method thermal conductivity for each sample until at least one fixed interval of samples has been collected; computing the average Thermal Conductivity over the fixed interval using the difference of averages from the computed thermal conductivities in the first half of the fixed interval of samples and the second half of the fixed interval of samples; saving and graphing the computed average Thermal Conductivity for the period; collecting another sample point; repeating the process from step B until the Thermal Response Test is completed; making a determination of Quality of the test based on anomalous deviations from expected results; and making an observation of any non-continuous thermal transfers observed and any periodic variations. Currently known Quality issues observed include environmental thermal and solar exposure such as by displaced pipe insulation or the lack of a tent covering for the testing apparatus thus allowing solar radiation to influence the testing apparatus internal temperature measurements. Further, limited duration spikes in ground conductivity uncovered by this computation method have been found to be associated with ground water movement within aquifers such as from municipal well water pumping.

BRIEF DESCRIPTION OF THE DRAWINGS

FIG. 8A is a Tabular Representation a Computation Simplification Using Recursion;

FIG. 9A is a Flowchart of the Program Executed by The Computer of FIG. 9;

FIG. 15 shows basic Formulas for Thermal Transfer and Application;

DETAILED DESCRIPTION

Figure 1:
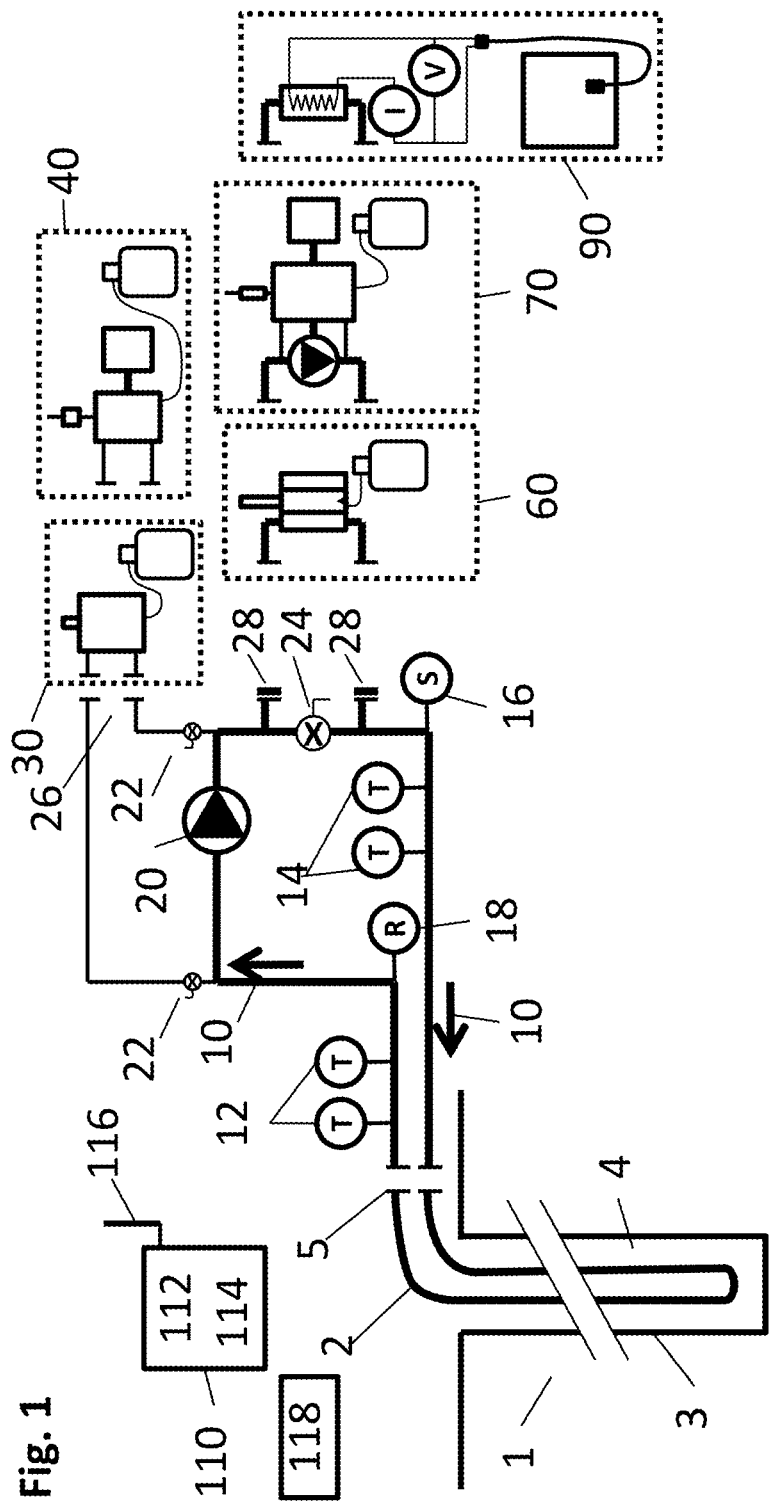
FIG. 1 is an Overview of Advanced Thermal Testing Apparatus Embodying the Invention.

The present invention introduces new hardware with alternate, less stable, and more thermally efficient heat input sources together with a new method for TRT using a multidimensional dynamic model-based and time-continuous analyses based generally on the electric circuit theory of Thévenin equivalence to 1) allow an unstable and fluctuating heat input; 2) empirically determine ground Heat Capacity (HC), grout Thermal Conductivity (TC), and grout HC in addition to ground TC utilizing the least computationally intensive method possible and using the least number of parameters possible; 3) directly and empirically confirm reported bore depth and pipe configuration; 4) dramatically reduce the TRT period by dynamically determining when to terminate the TRT; and 5) report the frequency and duration of anomalous thermal movements in the ground such as from ground water movement. By eliminating the requirement for extremely stable electric power (for resistive heating) which to date had to be supplied with an expensive, stand alone generator of sufficient size, this new TRT device and method creates a much lower cost TC/HC determination capability which can be employed by any contractor, and further provides for post installation determination of the same for a fully installed GHP borefield using building operational data.

Several new non-electric-resistive heating apparatus are described, new apparatus to measure the loop length and flow, and several new methods to obtain the improvements cited. One method is to mathematically model the pipe-grout-borewall-ground thermal system, gather the thermal response data, create a dynamic simulation based on the model with the measured actual heat input, and then perform a multidimensional correlation between the dynamic simulation and the collected data to determine the most likely grout and ground TC and HC parameters, and confirm other installation properties such as bore depth, bore diameter, and pipe size and configuration. This method of multidimensional correlation analysis involves experimentally adjusting the values to be determined until a "best fit" solution or set of "best fit" solutions are found. This approach is further automated to repeat continuously with each added set of gathered data to log the changing "best fit" solution and secondarily determining when the testing can be terminated with assurance for accuracy. Even further, an acoustic method is employed measuring round trip loop propagation time to more accurately determine the loop length which is often reported inaccurately, thus reducing the number of known unknowns which previously limited accuracy of a TRT. This added acoustic system is also used to compute fluid flow rate based on the differential time of transit between no-flow and flow-enabled states, a very important parameter when heat rate and/or flow rate fluctuate which is explicitly part of this innovation meant to eliminate the use of an expensive, stable generator for power.

The invention specifically applies the theory of Thévenin equivalent circuits to this physical thermal properties TRT to reduce the mathematical complexity of the solution sufficiently that it can be implemented in an embedded computer unit in the new TRT apparatus and for very rapid best fit solution capability without sacrificing any quality of the results. The application of such "minimum equivalence" to this thermal network of elements (pipe/grout/earth) was proven efficacious as documented and published by the U.S. Department of Energy's Oak Ridge National Laboratories (ORNL) just after our initial patent filing for the subject invention. That ORNL report is ORNL/TM-2017/208, published 1 Apr. 2017. It has been previously suggested that Numerical Methods could be used to solve the general matter we address, but none have suggested it could be done with accuracy using only a extremely limited number of terms such as we have done based generally on Thévenin equivalent circuit theory. As described here, we solve the general case problem with just three (3) terms with the 3rd term applied recursively to simulated distance outward from the loop under test together with advancing time, which could be further reduced to just 2 terms if less precise grout TC and HC parameters are acceptable for all pipe configurations. We do not further present the 2 term solution as the GHP industry needs the new and very important "grout quality validation after installation" testing capability, although just 2 terms could be used accurately for "concentric" loop pipes (pipe within a pipe) where the grout is only between the pipe and the borewall (i.e., no grout "inside" the configuration of the loop pipe). The industrial value of our "just 3 terms" modeling and simulation solution is further enhanced because it can always be implemented on an embedded microprocessor device within the testing apparatus without the need for "cloud computing" as simulation analysis usually requires. Even further, this maximally simplified solution is so small programmatically that it can be implemented directly in computer hardware (H/W) such as a Field Programmable Gate Array (FPGA) or Application-Specific Integrated Circuit (ASIC). It is only with such simplification and direct H/W implementation that we can achieve continuous full grout and ground TC and HC best fit determination for each added data collection sample without expensive computer resources, and this is an important product step forward for lowest cost, highest quality, and minimum time TRT analysis. This new method is in use in the GHP market.

This invention further increases the reliability/accuracy of the TC result by involving a higher resolution data collection protocol and analysis. Again, this approach with higher time resolution analysis is not practical for simulation correlation analysis without the computational simplification our new techniques bring.

Further, information about varying strata in the ground may be collected, analyzed, and reported to explain observed variability within the loop under test and effective TC of the ground. By periodically pausing the heat input and loop flow just long enough for temperatures to settle and heat to stabilize around the pipe, the flow can then be restarted and a fast set of temperature measurements will yield zones of greater and lesser thermal conductivity along the geothermal loop. Additionally, information about known variations in the conditions surrounding the loop, such as changes in bore diameter, can be entered and modeled/simulated to add even greater precision to the results given.

One specific aspect of this invention is to eliminate the TC Testing dependence on clean electric power for heating the fluid in the pipe loop. This electric power is often provided by an expensive generator pulled to the site on a trailer and which requires a significant amount of fuel. The efficiency of a generator is typically only about 20%-30%, meaning only 20%-30% of the heat value of the fuel is successively converted into electricity and thus to heat by resistive heating. By eliminating the "high quality electric only" heat input requirement of current TRT methods, a much higher percentage of the heat value of each quantity of fuel can be used, thus reducing fuel use and testing cost. This advancement also makes the entire apparatus shippable with the user only needing to add a propane cylinder or other such "fuel" for use after connection to the loop under test. Further, many heat input sources can be utilized such as direct fuel water heaters, solar water heaters thermal collector, heat pumps, etc.

By reducing the cost of a GHP TRT, this advancement will increase TRT testing use and will thus improve the quality of GHP system design. Additionally, this new capability of after-the-fact completed GHP loopfield TRT testing with varying thermal input opens a new door for GHP system analysis and validation, has already led to new GHP loopfield learnings, and may lead to future loopfield design improvements.

This invention applies equally to any form of GHP loop system, whether vertical bore, horizontal bore, horizontal/trenched (many forms), pond, thermal pile, completed loopfields, etc. Vertical bore is used as the example for all matter herein, but is not meant to limit the applicability of this advanced approach.

Further, a new method is presented for lowering the time length required for an accurate TRT by determining ground TC in a time-wise continuous method and applying a new technique to determine when more testing is not needed. This new process involves computing and saving the time-wise continuous instantaneous TC of the earth (earth always takes longer then grout) being the slope of the log of time referenced recorded loop temperature data. This slope can be either instantaneous (difference between the last 2 samples) or based on the difference between 2 adjacent boxcar running averages each over a small period of time such as 2-10 minutes. The TRT is determined to be complete when the slope of the variation of next-TC value drops below a previously determined "desired accuracy" value such as by calculating the root mean square of the variation in the TC samples.

The following is a very basic description of one possible embodiment of this invention.

Referring now to the drawings, FIG. 1 shows an overview of the Advanced Thermal Testing Apparatus which includes all of the objects shown in the figure except the ground under test 1 via a fluid loop protruding above ground level 2 shown here inserted into a deep well bore 3 and surrounded by a typical fill material called grout 4, with the pipe loop 2 connected to the subject testing apparatus via temporary coupling 5 shown here disconnected. The Advanced Thermal Testing Apparatus is shown with several common elements (10 through 28 and 110 through 116) and several optional thermal source modules (30 through 90). The common elements are a fluid pipe loop 10 flowing in a clock-wise direction as shown here with redundant temperature measuring devices on the fluid return side 12 and fluid outgoing side 14, an acoustic sending device 16 and an acoustic receiving device 18, a fluid pump 20, several valves at 22 and 24, high-temperature limited-flow interconnections at 26, and lower-temperature full-flow interconnections at 28 shown here with caps. In one set of configurations, limited-flow high-temperature fluid heating devices such as 30 or 40 are connected to the core elements by opening valves 22 and using the connections at 26 with the valve at 24 left open and caps on the ports at 28, thus allowing heated fluid to be mixed into the flow of the system. Fluid heating device 30 as shown here is an on-demand heater and propane supply which is further shown in detail in FIG. 2. Fluid heating device 40 as shown here is a water-cooled propane powered engine and generator which is further shown in detail in FIG. 3. In another set of configurations, the valves at 22 are closed and the valve at 24 closed and caps at 28 removed so full-flow fluid heating devices 60, 70, or 90 can be attached. Fluid heating device 60 as shown here is a high flow volume propane water heater which is further shown in detail in FIG. 4. Fluid heating device 70 as shown here is a water-cooled propane powered engine driving both a generator and a pump which is further shown in detail in FIG. 5 and which can allow the pump at 20 to be removed. Fluid heating device 90 as shown here is an electric resistive heating element in a pipe powered by a separate large generator with both current and voltage measuring devices to allow backward compatibility with prior industry approved Thermal Testing Methods. Control, data collection and storage, and data processing is done by a computer 110 containing a computer program 112 which further supports communication via the internet via an antenna 116. A battery 118 is included to assure both the computer/control/data-logging element 110 and pumping element can be powered for initial acoustic and temperature measurements before a heating device is enabled. The simulation algorithm may in some embodiments be further optimized by burning it into a hardware element 114 such as an FPGA or ASIC.

Figure 2:
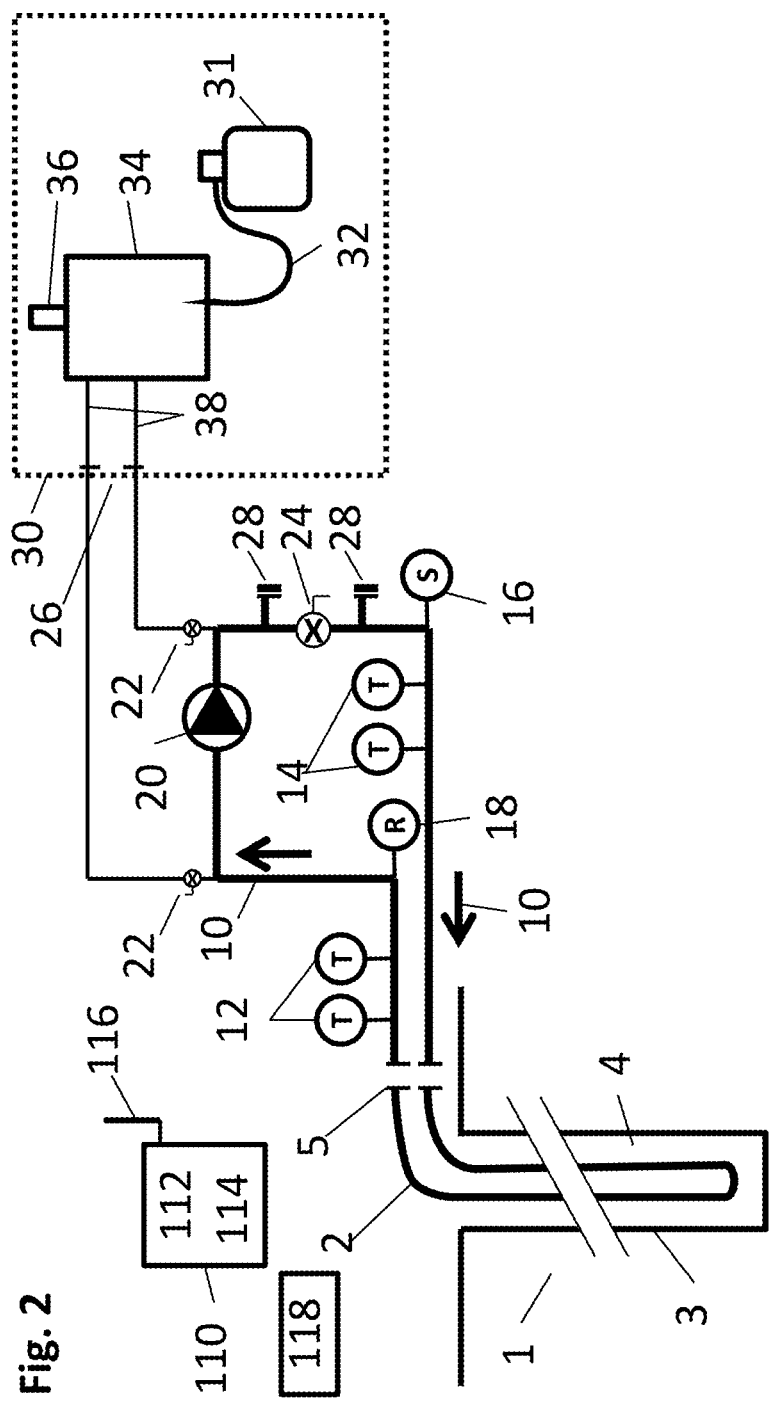
FIG. 2 represents an Embodiment with On-Demand Water Heater as the Heat Source.

FIG. 2 shows one embodiment of the Advanced Thermal Testing Apparatus which includes all the core elements and test loop items already detailed in FIG. 1 (1 through 28 and 110 through 118), but which is specifically attached here to the low-flow high-temperature fluid heating device 30 at connection ports 26 by opening valves 22. Shown here, this heating element is powered by a fuel source such as a propane tank 31 connected with a hose 32 to an on-demand water heater 34 with a flue 36 connected and to the core elements of the Testing Apparatus and thus the loop under test via pipes 38. The method of connection provides a pressure differential between the two connection pipes that is created by the pump 20, and which is sufficient to assure a steady flow of relatively high temperature fluid circulating counter clockwise in the pipe loop connected to heating device 30 which is well mixed into the system by the pump 20.

Figure 3:
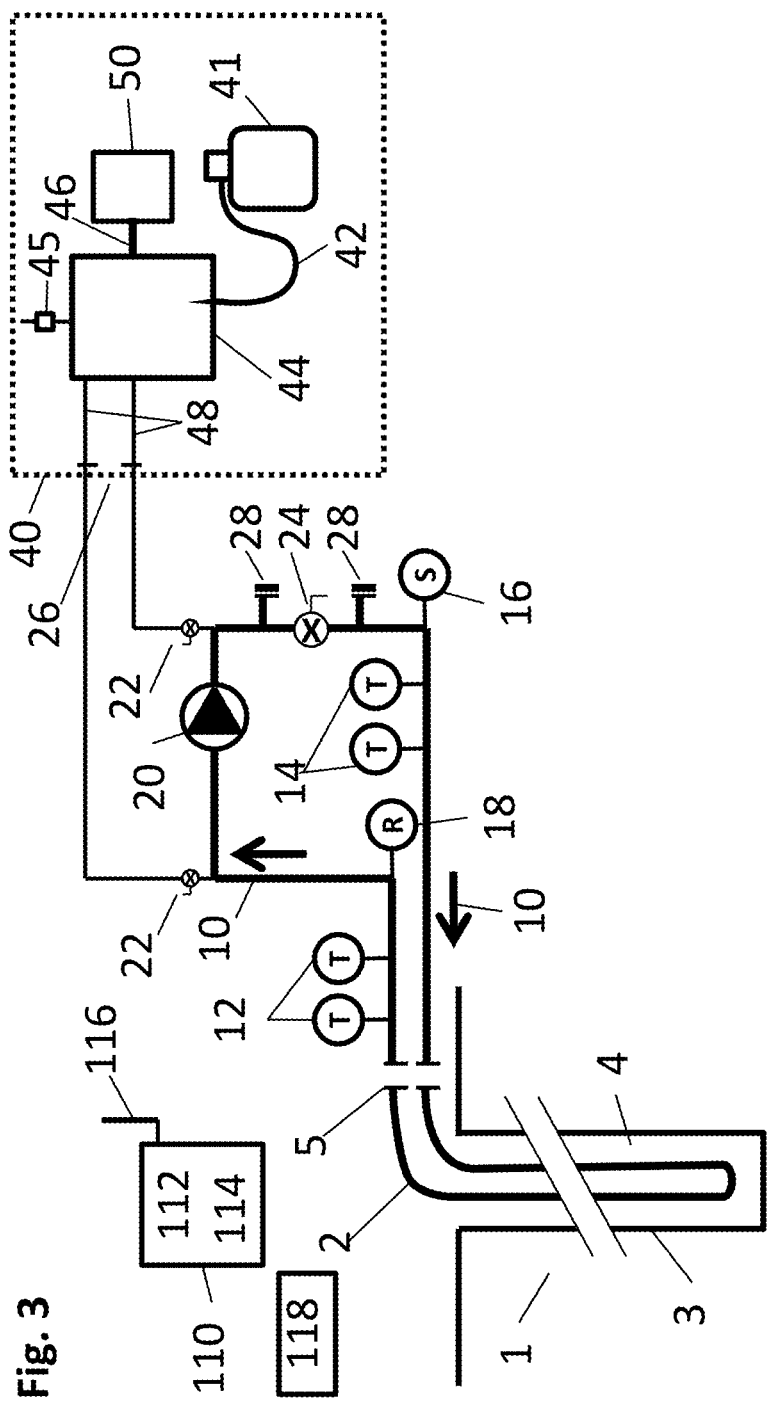
FIG. 3 represents an embodiment with Water-Cooled Engine as the Heat Source with Generator.

FIG. 3 shows one embodiment of the Advanced Thermal Testing Apparatus which includes all the core elements and test loop items already detailed in FIG. 1 (1 through 28 and 110 through 118), but which is specifically attached here to the low-flow high-temperature fluid heating device 40 at connection ports 26 by opening valves 22. Shown here, this heating element is powered by a fuel source such as a propane tank 41 connected with a hose 42 to an internal combustion engine 44 with muffler and exhaust pipe 45 connected by shaft 46 to a generator 50 which is used to power the entire apparatus without any separate generator, with the internal combustion engine being water cooled by connection to the core elements of the Testing Apparatus and thus the loop under test via pipes 48. This combined water heating and power generation unit is often called "Combined Heat and Power" (CHP). The method of connection provides a pressure differential between the two connection pipes that is created by the pump 20, and which is sufficient to assure a steady flow of relatively high temperature fluid circulating counter clockwise in pipe loop connected to the heating device 40 which is well mixed into the system by the pump 20.

Figure 4:
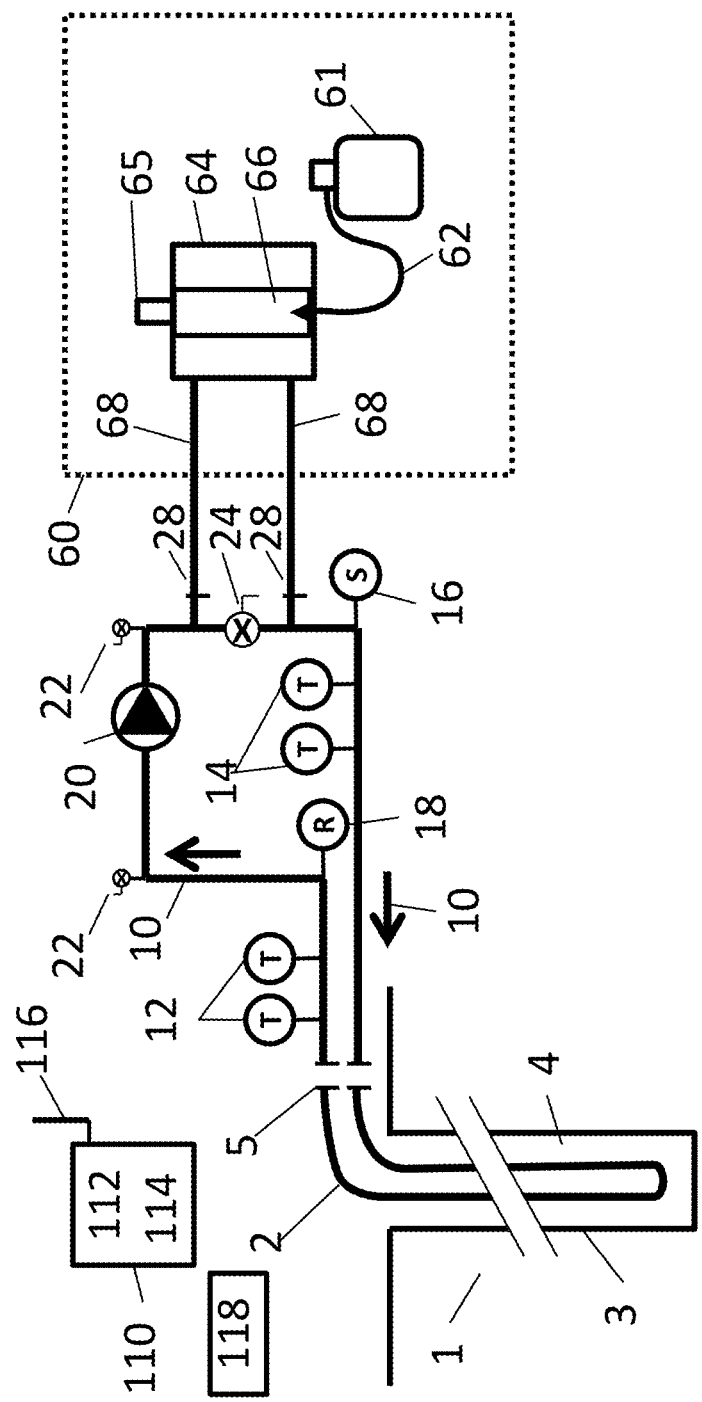
FIG. 4 represents an embodiment with Tank-Style Water Heater as the Heat Source.

FIG. 4 shows one embodiment of the Advanced Thermal Testing Apparatus which includes all the core elements and test loop items already detailed in FIG. 1 (1 through 28 and 110 through 118), but which is specifically attached here to the full-flow fluid heating device 60 at connection ports 28 and incorporated into the flow of fluid pipe loop 10 by closing valves 22 and 24. Shown here, this heating element is powered by a fuel source such as a propane tank 61 connected with a hose 62 to a tank style water heater 64 with a flue 65 and flame chamber 66 connected to the core elements of the Testing Apparatus and thus the loop under test via pipes 68 thus adding heat to the loop 10. The method of connection provides full flow of the loop 10 fluid driven by pump 20 through the water heater 64.

Figure 5:
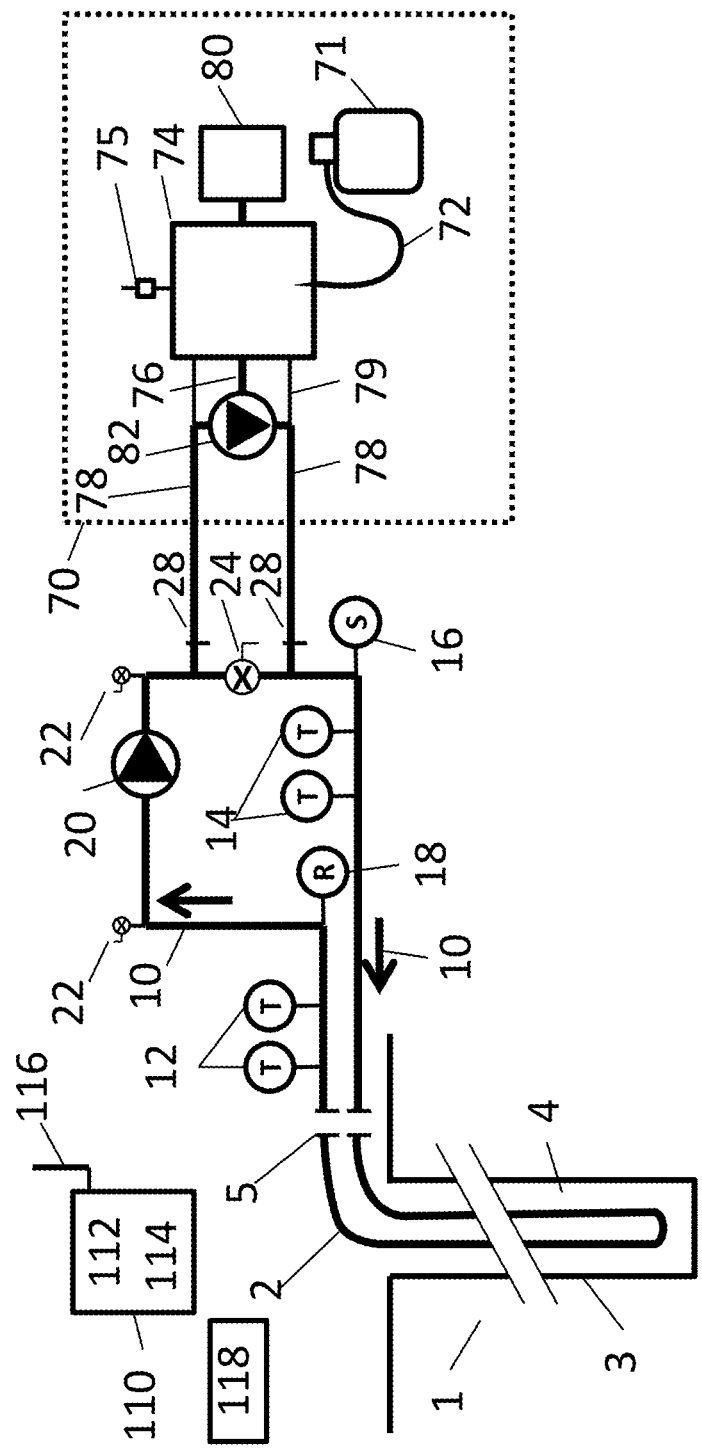
FIG. 5 represents an Embodiment with a Water-Cooled Engine as the Heat Source.

FIG. 5 shows one embodiment of the Advanced Thermal Testing Apparatus which includes all the core elements and test loop items already detailed in FIG. 1 (1 through 28 and 110 through 118), but which is specifically attached here to the full-flow fluid heating and pumping device 70 at connection ports 28 and incorporated into the flow of fluid pipe loop 10 by closing valves 22 and 24. Shown here, this heating element is powered by a fuel source such as a propane tank 71 connected with a hose 72 to an internal combustion engine 74 with muffler and exhaust pipe 75 connected by shaft 76 here to both a generator 80 which is used to power the entire apparatus without any separate generator and a shaft driven pump 82 which will drive the loop 10 flow allowing the core elements pump 20 to be removed, with the internal combustion engine being water cooled and the loop 10 heated by connections 79 across the pump 82 to the core elements of the Testing Apparatus and thus adding heat to the loop 10 via pipes 78.

Figure 6:
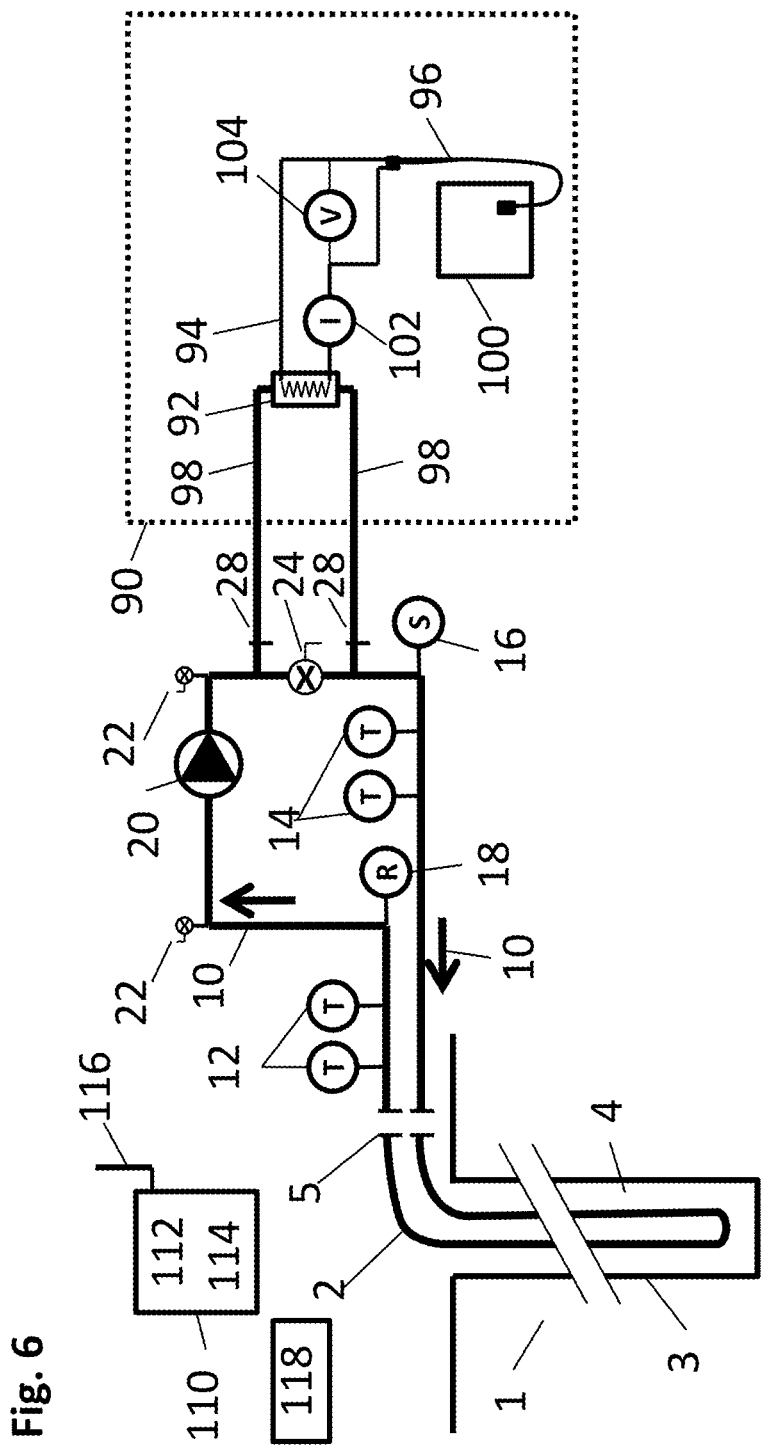
FIG. 6 represents an embodiment with Electric Resistive Heater as the Heat Source.

FIG. 6 shows one embodiment of the Advanced Thermal Testing Apparatus which includes all the core elements and test loop items already detailed in FIG. 1 (1 through 28 and 110 through 118), but which is specifically attached here to the full-flow fluid heating device 90 at connection ports 28 and incorporated into the flow of fluid pipe loop 10 by closing valves 22 and 24. Shown here, this heating element is an electric resistive heating element 92 connected to the core elements of the Testing Apparatus and thus the loop under test via pipes 98 thus adding heat to the loop 10, with the electric resistive heating element 92 powered via electric circuit 94 and cord 96 by an electric power source such as a fuel-powered generator 100, with both current sensor 102 and voltage sensor 104 placed in the electric circuit so power input and thus heating levels can be data logged by the computer 110.

Figure 7:
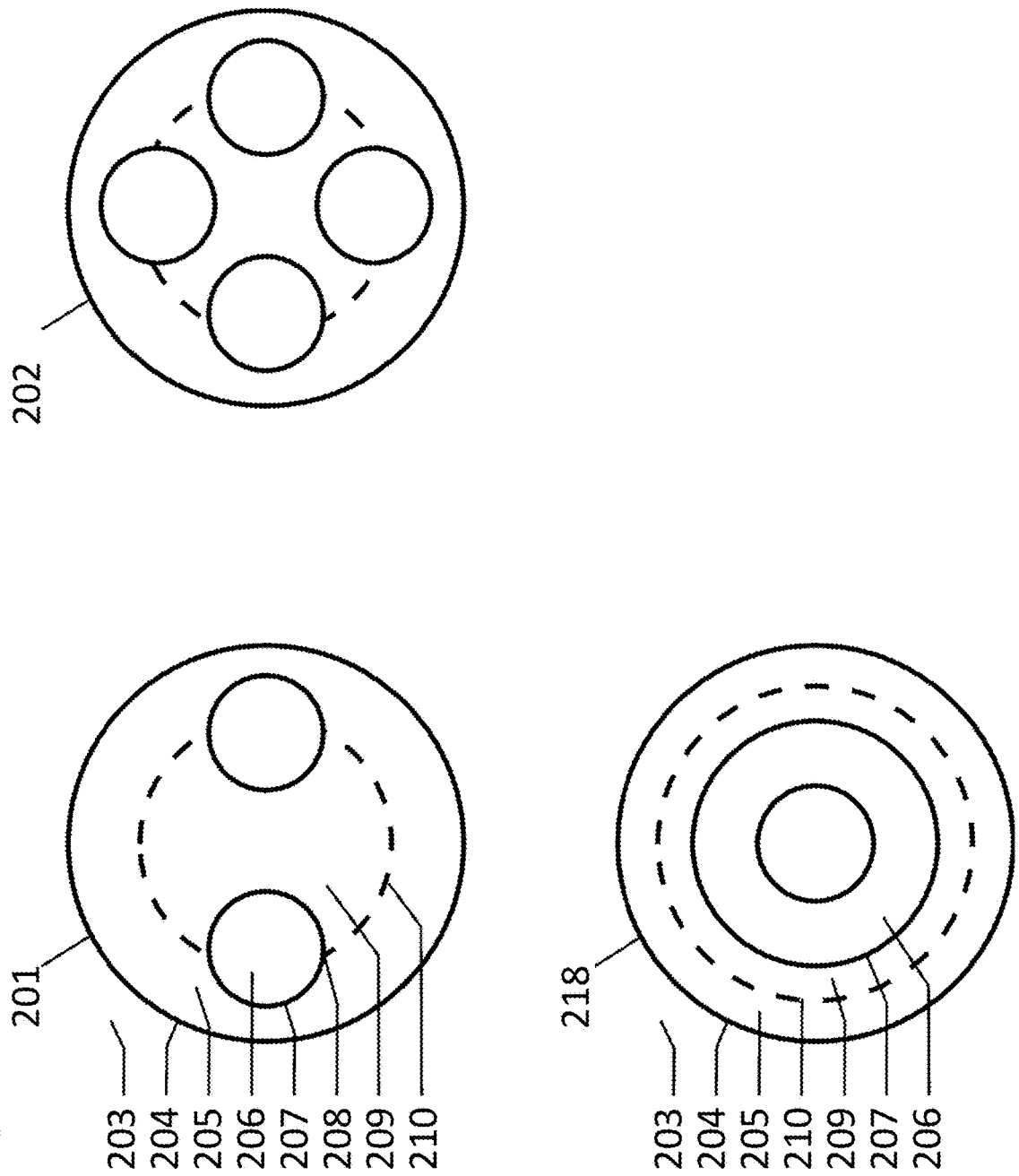
FIG. 7 is a Simplified Borehole Thermal Zone Layout.

FIG. 7 shows the simplified thermal zone layout associated with typical uses of the subject invention. Shown is a typical "well bore" 201 with a single loop pipe 207 (one side with fluid flow going down the bore and the other side with fluid flow returning up the bore), a typical "well bore" with a "double loop" 202, and a typical well bore 218 with a "concentric pipe" 216. While we only show this with "well bore" terminology, the exact same applies to all "loop" installation methods as each has the same elements, such as loop in grout and rock for a well bore, loop in grout and soil for a horizontal bore, or just loop in soil for a horizontal loop. In the basic bore model 201, we see the surrounding "earth" or soil 203, the bore wall 204 if present, the grout 205 that is outward from the pipe 207, the fluid within the pipe 206, a virtual boundary 208 and 210 bisecting the pipe 207 which what we call the inner grout 209 from the outer grout 205. The same two "zone" approach is used with differing loop pipe configurations for model simplicity. For example in the concentric loop pipe example 218, the virtual boundary 210 between the outer grout 205 and the inner grout 209 does not bisect any pipes.

Figure 8:
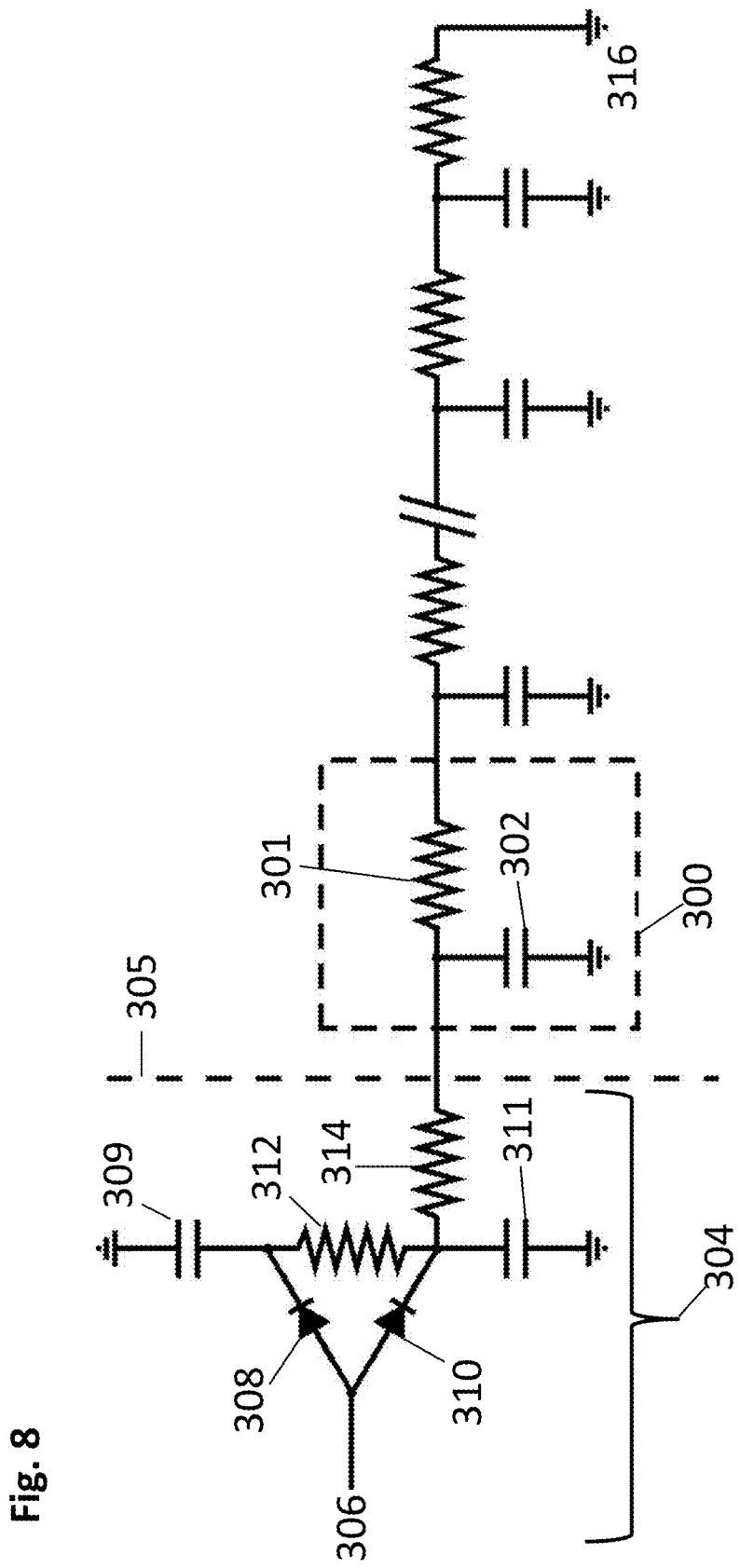
FIG. 8 is a Reduced "Circuit Equivalent" of Ground and Grout.

Implementing a minimal parameter model using minimal terms, FIG. 8 shows one example of a refined and reduced "circuit equivalent". The concept of a Resistor-Capacitor (R-C) circuit equivalence has been discussed before, but a key barrier to its reduction into practice has been reliance on standard "finite element" approaches to the number and connection of the "elements" which we call a "cell" indicated by 300 in this figure. The "finite element" approaches are highly computational heavy involving normally thousands of such cells, and are often run on super computers. We have found that dramatic simplification can be undertaken while still achieving the modeling accuracy sufficient to reduce the error from 15% to 5%. In our model, we have even further simplified the "bore" area 304 which models the previously shown pipe 2 well bore 3 and grout 4 in FIG. 1. In this view and each representing fundamental thermal conduction and thermal storage aspects of the associated grout or ground substance, circuit lines indicate paths of heat flow, resistors 301 correspond to the TC conduction aspect of the substance, and capacitors 302 correspond to the HC storage aspect of the substance. Standard industry formulas used to convert between heat rate (e.g., BTU/hr or Watts (W)) and temperature (e.g., ° C. or ° F.) are shown in FIG. 15. In each time step, the amount of heat energy transferred is determined by the cell's corresponding TC and the temperature difference to the adjoining cell, then that heat energy is "moved" from one cell to the next by reducing the temperature of the sending cell and increasing the temperature of the receiving cell using the standard formulas.

In our reduced model, we have eliminated the pipe entirely from the computation due to its extremely low relative mass. Heat energy from the fluid 306 (from flow and temperature data) is transferred directly from the pipe(s) physically inward as indicated by diode 308 and placed into heat storage as depicted by capacitor 309 for the "inner grout" and via diode 310 into capacitor 311 for the "outer grout". Only that portion of heat equivalent is transferred mathematically to the inner grout for it to match temperature with the outer grout, and energy moves between the inner and outer grout via resistor 312 when a temperature difference exists between them. In the circumstances of a single "pipe" such as for a concentric pipe system, diode 310 is eliminated and all of the heat put to the "inner grout" via diode 308 into capacitor 309. After the "outer grout" signified by capacitor 311 and resistor 314, heat passes through the borewall signified by the vertical dashed line 305, then continues to flow through successive "cells" 300 through 316 corresponding to the TC 301 and HC 302 of the substance. Energy is moved for each time period which matches the time rate of the recorded field sample data. For horizontal loops, heat transfers like a concentric pipe system with the grout and ground parameters having the same values.

FIG. 8A shows one tabular example of a further refined and reduced computational approach for the simulation achieved by recognition that the TC/HC of the Ground portion of the simulation are constant for any best fit computation and that energy between cells only flows forward with the advancement of time (downward arrow in figure). Computation of the grout portions of the simulation 318 recur as described for FIG. 8 above. But the Ground formulaic term computation 319 can be applied in a fully recursive manner stepping forward in "Time" (downward in the Table and moving ahead of row associated with the current data sample) while stepping outward in the Ground substance (abbreviated "Gnd" in the table header), thus reducing the Ground aspect of the computation to a single formula being repeated using its own prior result (recursion) for one of the two adjacent "cell" values and only needing to "read" a single other value (the other adjacent cell). This computational simplification even further supports embedding into computer hardware (e.g., FPGA/ASIC) for allowing ample time to fully resolve each new simulation correlation best fit between data samples.

Figure 9:
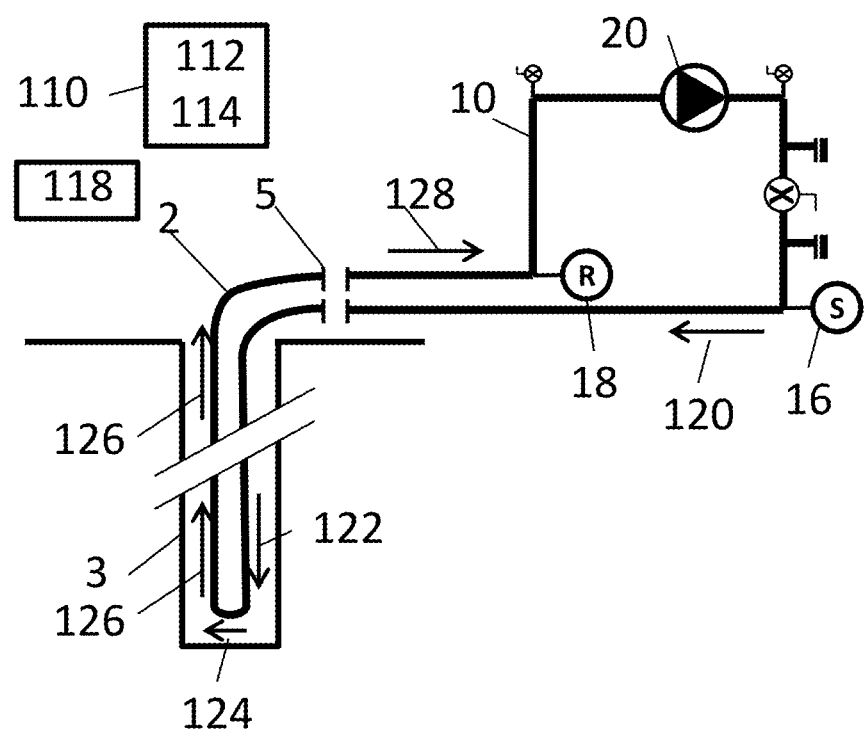
FIG. 9 is an Acoustic Confirmation of loop Length and Real-Time Flow Measurement.

FIG. 9 is one embodiment of the combined acoustic loop length and fluid flow rate logging system where the computer 110 controlled by a software program 112 initially under battery 118 powers the acoustic sending device 16 to initiate an acoustic pulse within the pipe loop as indicated by arrows starting with 120 then traveling down 122 one side of the pipe loop 2, around the far end 124, back toward the test unit 126 and finally arriving 128 at the acoustic receiving device 18 with the computer program 112 logging the time required for the round trip acoustic pulse.

FIG. 9A is a flow chart showing the process for acoustic processing where before fluid flow starts an acoustic pulse 130 is sent then received and logged 132 to compute the actual length of the pipe loop which often differs somewhat from that reported by the installer. Once flow is initiated 134 by the pump 20, then acoustic pulses are sent 136 received and logged 138 at every thermal data sampling 140 to calculate the flow rate by observing the differential pulse transit time, with conversion within the computer 110 to a flow rate based on both the initial loop length and the water temperature. Each time an acoustic reading is needed, many actual measurements are made by repeating and logging 142 then statistically averaged to produce a more precise value.

Figure 10:
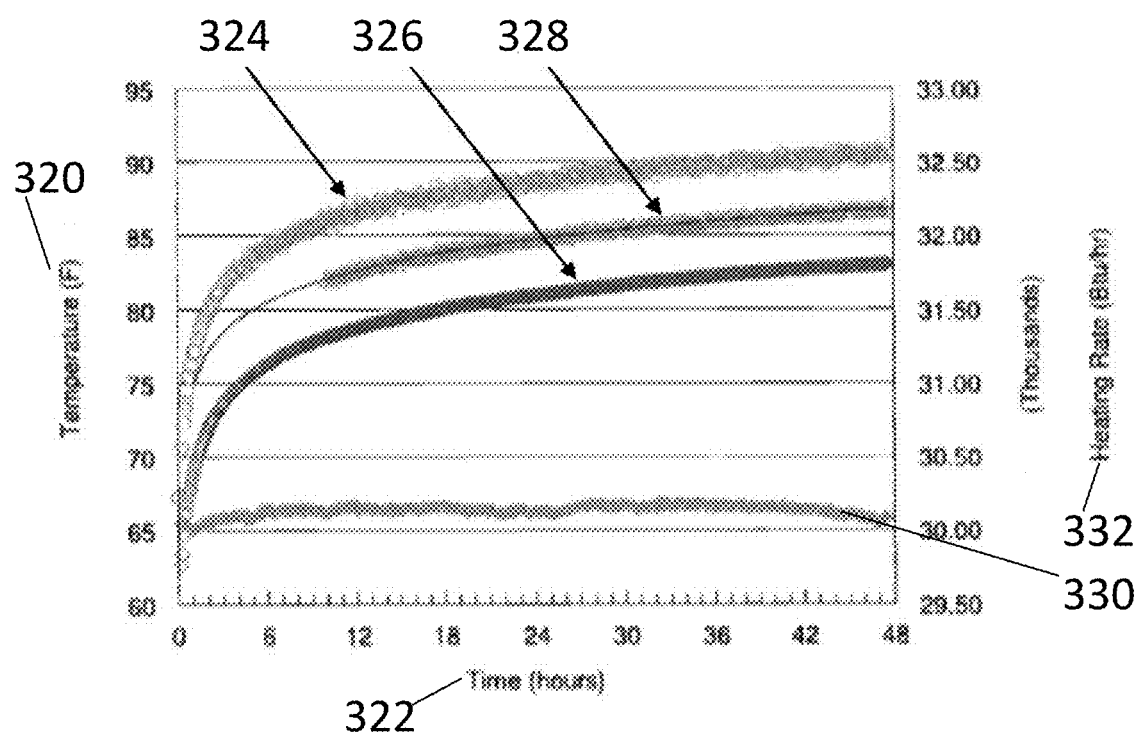
FIG. 10 represents a Typical Existing Thermal Response Testing Data Graph—Real-Time Based.

FIG. 10 is a typical graphic output of measured thermal data (upper 3 curves) showing the temperature 320 versus time 322 of the "heated" fluid going out to the ground 324, fluid returning from the ground 326 after heat is transferred to the ground, and the average of those two 328. Also shown is the Heat Rate (HR) graphed 330 which correlates to the right hand axis 332, in this case of the old TRT method having to be very stable as here showing less than 1% overall variation—this is the parameter we are explicitly now allowing to vary significantly.

Figure 11:
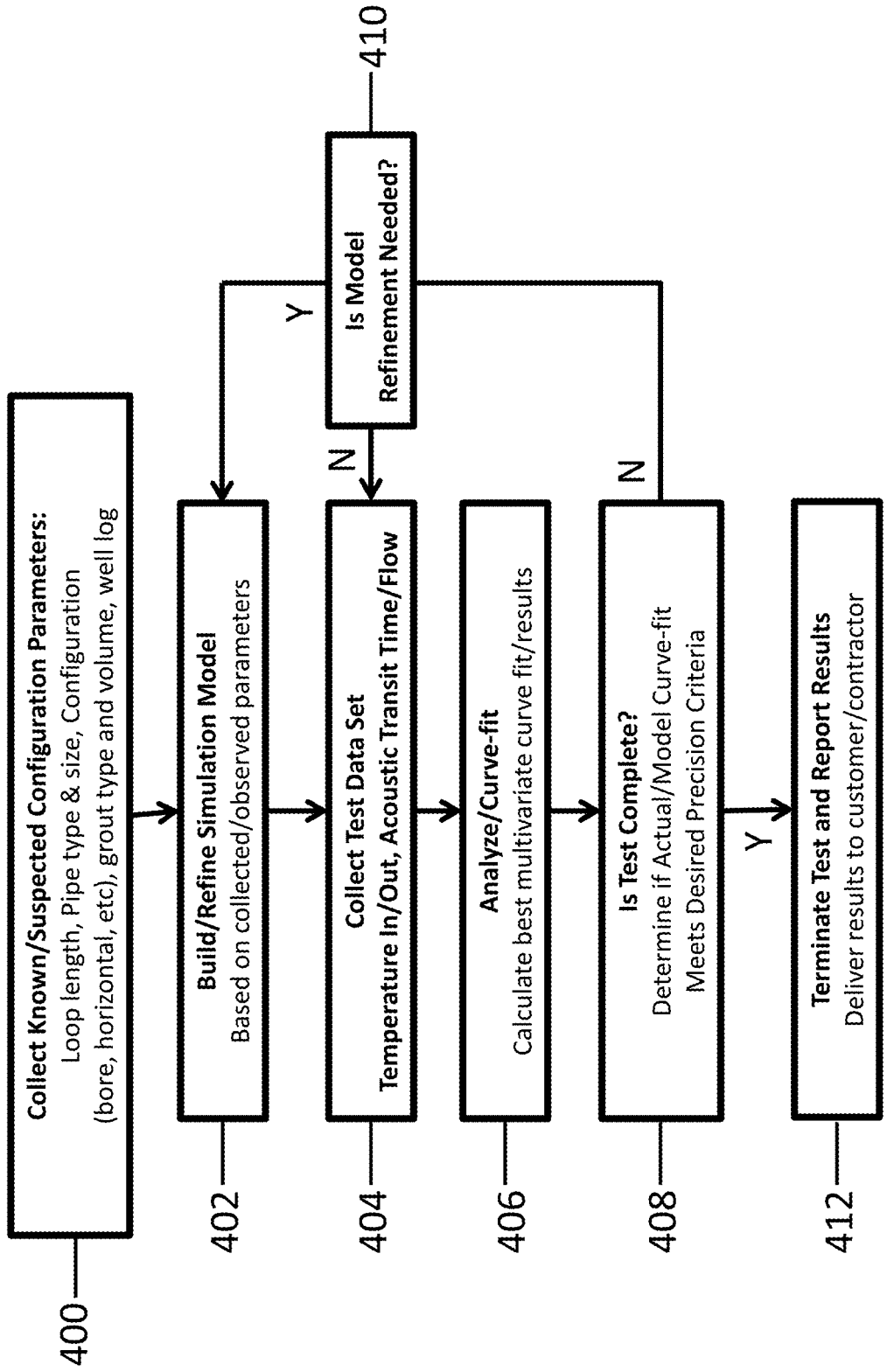
FIG. 11 is a Flow Chart of the Simulation TRT Method.

FIG. 11 shows a flow chart of the procedure for TRT analysis including the steps of collecting all available fixed parameters 400, loading all the data and parameters into the simulation model 402, perform one timed data logging of in/out (returning and leaving) fluid temperatures and flow/acoustic transit time 404, performed and a new "best fit" of the dynamic simulation model to actual data is performed 406, a statistical test 408 is performed and if the test is passed (Y), then the TRT can terminate 412 and a report be given to the user. If the statistical test does not (N) indicate that testing can terminate yet, testing continues first with determination 410 of whether any model parameters need adjustment (Y) and the model is then refined 402 as needed, or no refinement (N) is needed and operation continues with collection of another test data set collection 404 followed by a new best fit analysis 406, and so on until complete 412.

Figure 12:
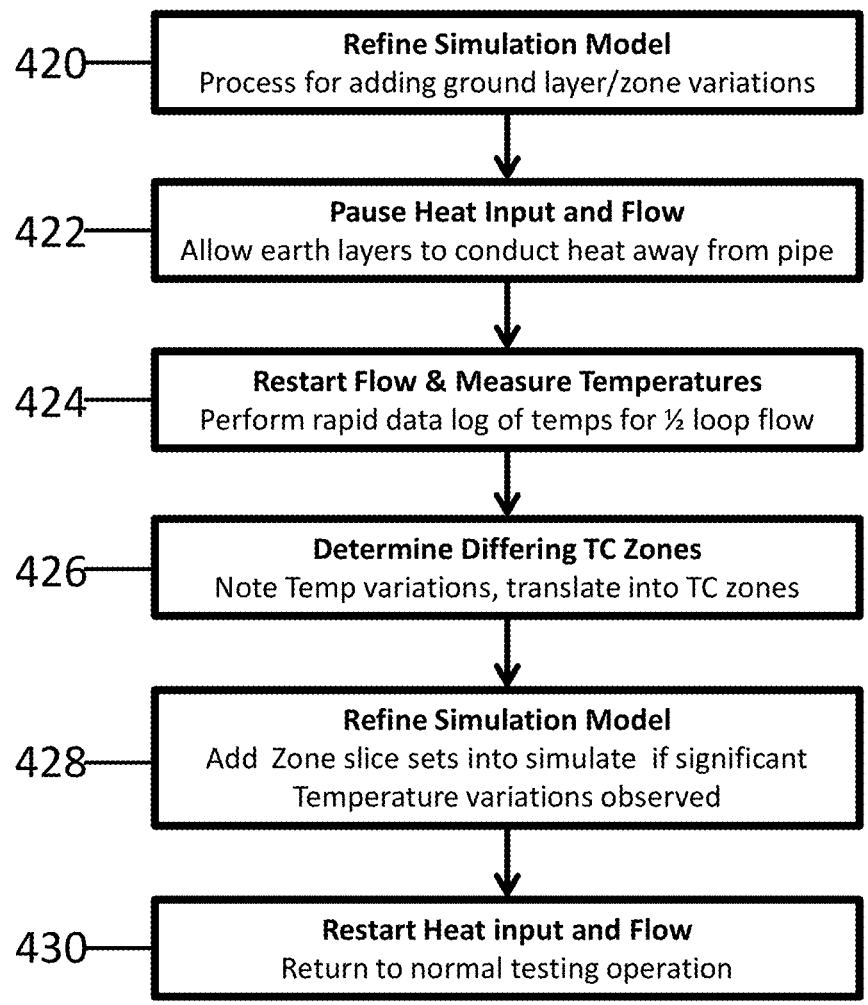
FIG. 12 is a Flow Chart for Adding Ground Layers to Simulation Model.

FIG. 12 shows a Flow Chart for Adding Ground Layers to Simulation Model, where in one embodiment a refinement of the model 420 is made to account for different layers of the ground under test, accomplished by pausing both heat and fluid flow 422 for enough time that the fluid temperature stabilized to its surrounding ground temperature at all locations in the pipe loop, the pumping alone is restarted 424 and a rapid set of temperature data is gathered just long enough to measure any fluid temperature variations for the entire length of ground under test (i.e., one half loop for vertical well bore with loop as generally shown herein), determination of any significant areas of different temperature 426 and if there are areas of significant difference the simulation model is refined 428. Finally, normal testing is restarted 430.

Figure 13:
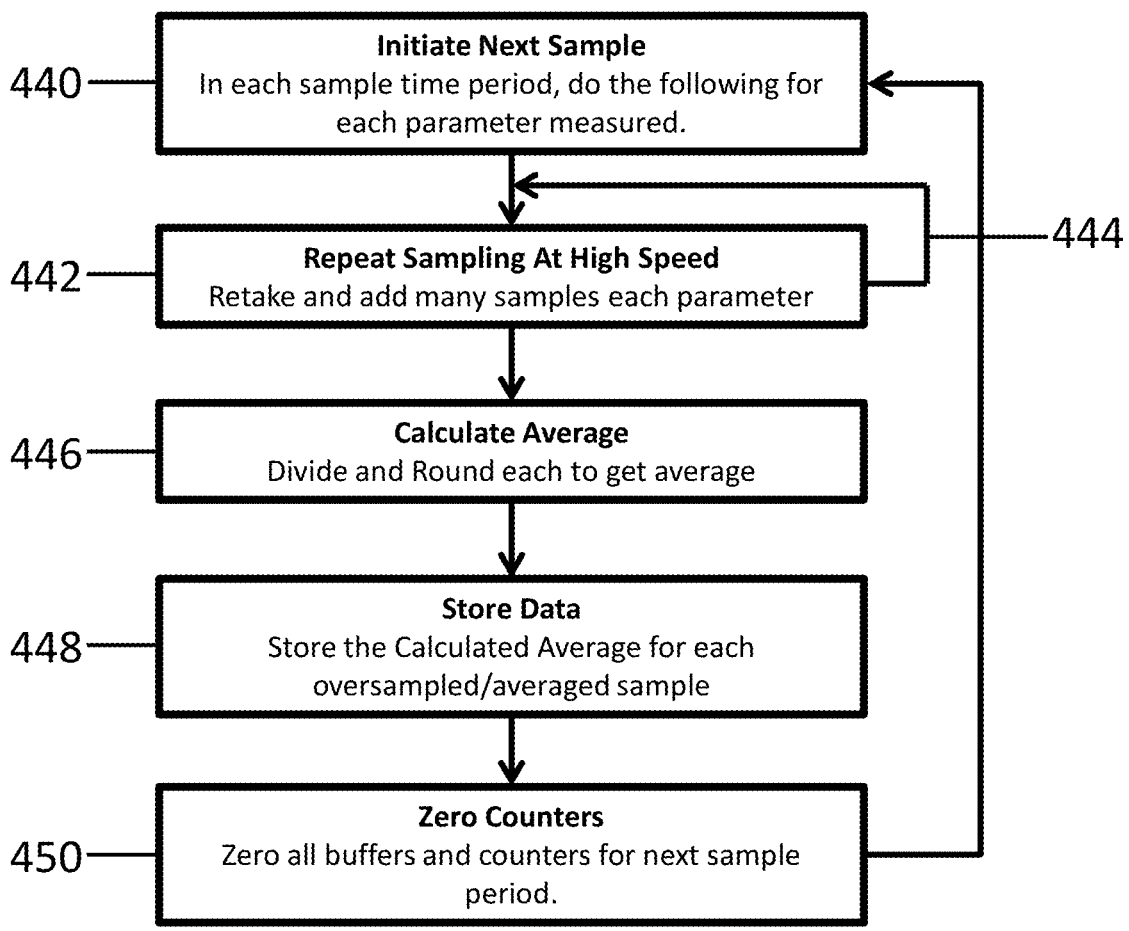
FIG. 13 is a Flow Chart Showing Oversampling for Added Precision.

FIG. 13 shows how oversampling is done to increase sample accuracy—this is a standard computer sampling method. Basically, the TRT method requires only 1-4 samples per minute so long as those samples are very high accuracy. However, there is always sample "jitter" or varying accuracy of each individual sample for a large number of reasons generally involving sensor resolution. To overcome this sample "jitter" and to thus obtain a very accurate sample, during the interval between samples 440 a very large number of raw samples are taken 442 and added together in repetition 444. At the end of the interval, this figure is divided by the number of samples and rounded off 446. Only that final "rounded average" is recorded 448, and the counters are zeroed 450 for the next sample period. Accuracy of the digital mathematics is essential for oversampling to be effective.

Figure 14:
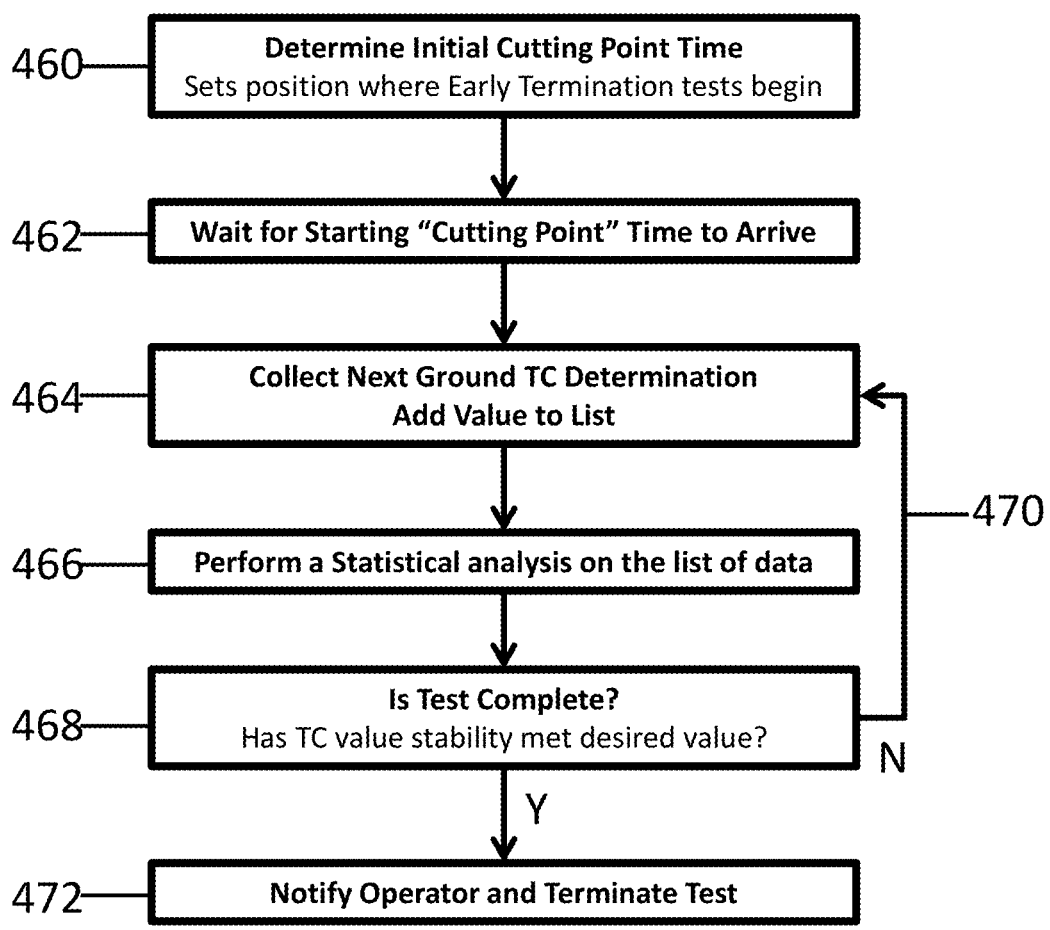
FIG. 14 is a Flow Chart Showing Early Termination Determination Method.

FIG. 14 shows a Flow Chart for an Early Termination Determination Method based on a "cutting time" 460 being when we expect the grout areas of a well bore to be thermally saturated and heat starting to enter the surrounding earth under test. Testing first waits for the starting point initial time to pass 462 and then repeatedly performs a repeating set of steps including collecting 464 the TC result from most recent data sampling and simulation correlation and adding that value to a list of all TC values collected after the "cutting point", perform 466 a statistical analysis on TC results, testing 468 to see if the test is complete such as by validating that the progressive RMS of the TC samples has dropped below a minimum standard, if the test shows testing is not (N) complete then iteration 470 to collect the next ground TC determination 464 occurs, or if testing is complete (Y) then 472 the operator is notified and the test terminated FIG. 15 shows the Formulas for Thermal Transfer and their application, where the Change in Temperature ($\Delta T$) for any modeled area (inner grout, outer grout, and earth areas) is calculated by formula 500 based on the entering Heat Rate (HR), which can be either positive or negative, and the currently presumed Heat Capacity (HC) and Mass of that modeled area; and the HR between any modeled areas is calculated by formula 502 based on the temperature difference $\Delta T$ between the areas, which can be either positive or negative, and the currently presumed Thermal Conductivity (TC) and area of surface that is the boundary between those areas.

Figure 15A:
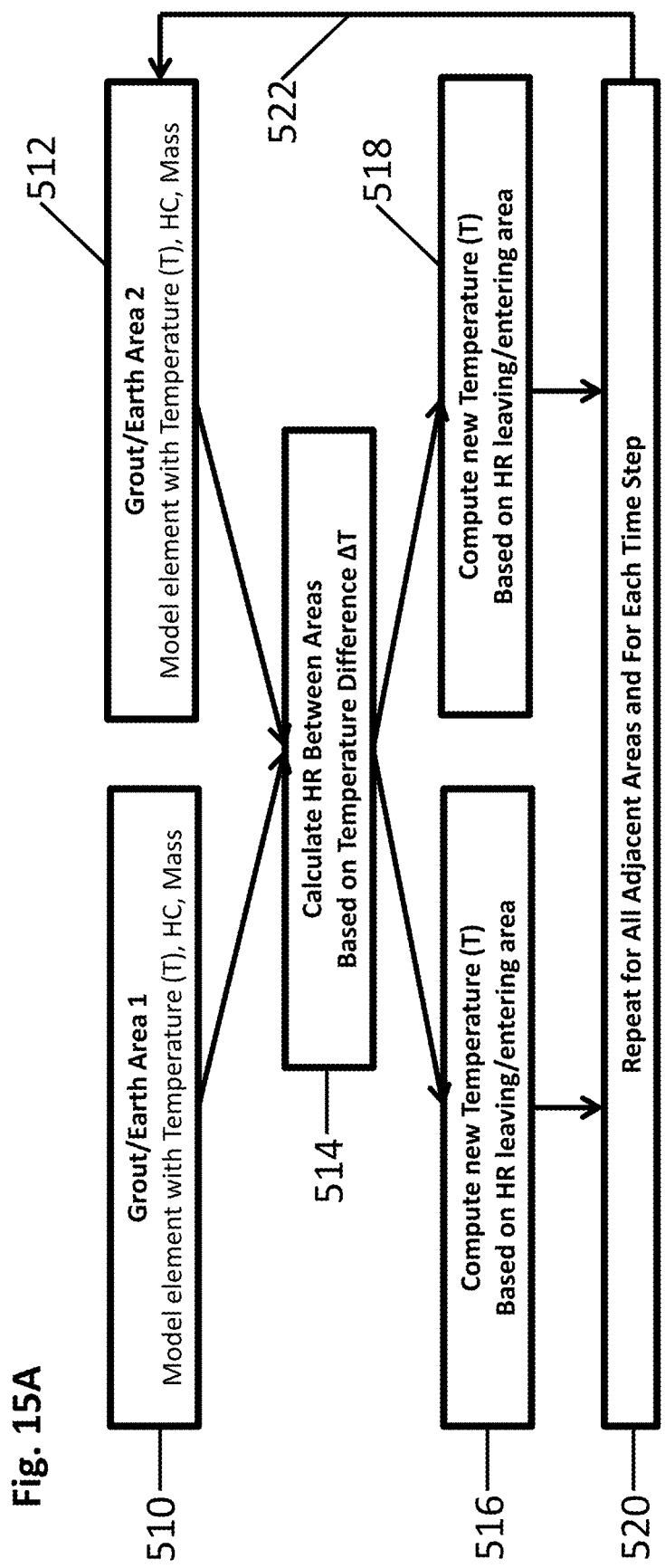
FIG. 15A is a Flow Chart Showing How the Basic Formulas for Thermal Transfer Are Applied.

FIG. 15A shows a flow chart for how the formulas in FIG. 15 are applied to the model where for each pair of adjacent areas in the whole model formula 502 is used to Calculate the Heat Rate (HR) 514 of energy flow between the two areas 510 and 512, and that HR is then applied to each of the two areas using formula 500 in steps 516 and 518 to calculate the new Temperature (T) for each area; with the whole process being repeated 520 for each pair of adjacent areas, and the whole process is repeated for each time step of the simulation 522.

Figure 16:
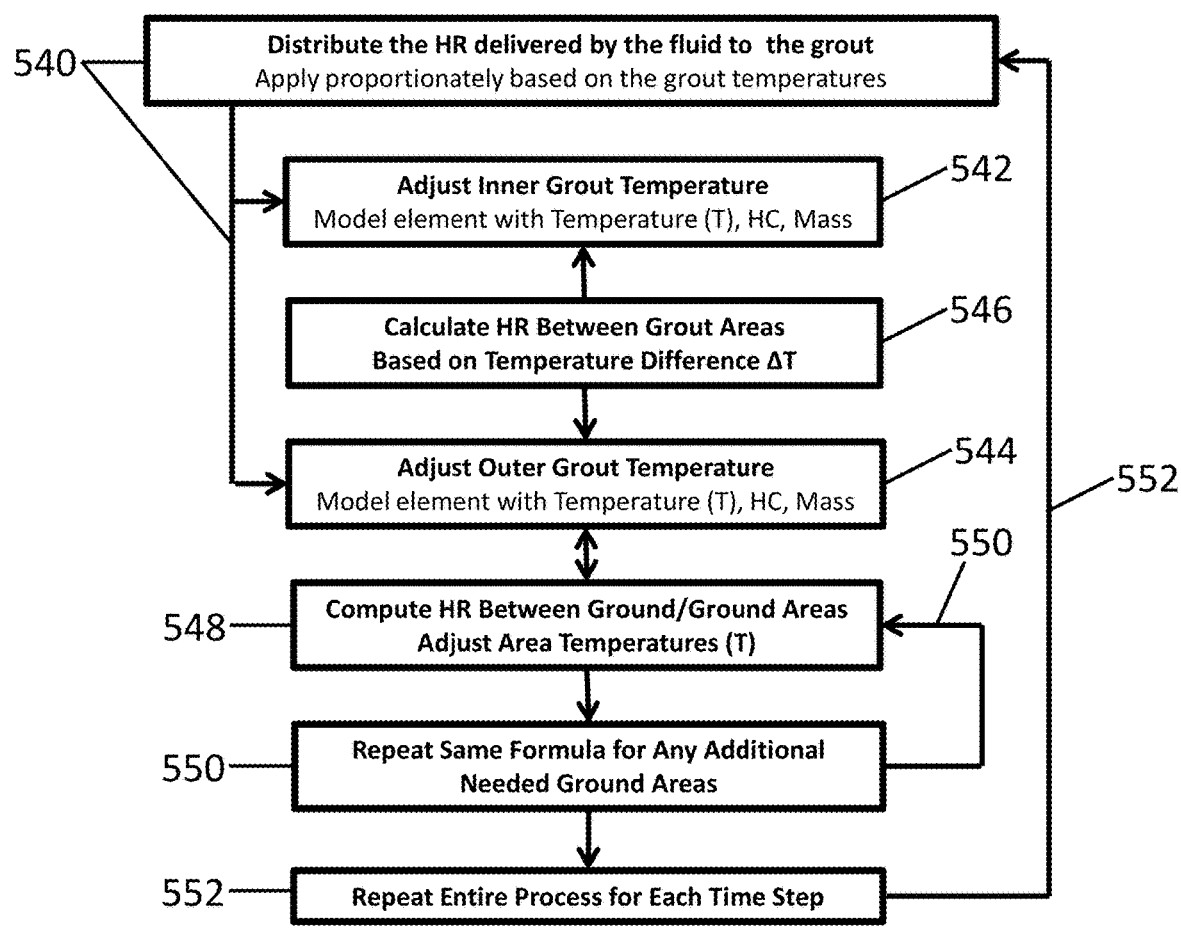
FIG. 16 is a Minimized Model Innovation Flow Chart.

FIG. 16 shows the Minimized Model innovation utilizing only three (3) formulas in Flow Chart form, starting with the Heat Flux as delivered by the pipe being divided 540 between the inner grout 542 and outer grout 544 proportionately based on the grout temperatures, then the heat transfer being calculated between adjacent areas of grout using one formula 546 for the grout-to-grout transfer because the pipe areas may need to be taken into account (no pipe to account for in concentric pipe configuration), and finally the more generalized formula 548 being applied repeated as needed between the outer grout and ground areas successively 550 as needed. The whole process is repeated 552 for each time step.

While specific embodiments of the invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. Apparatus for conducting a Thermal Response Test (TRT) to accurately determine Thermal Conductivity (TC) and Heat Capacity (HC) of Ground, and of Grout if present, using a previously installed fluid pipe loop inserted into the ground and having a fluid outgoing side and a fluid return side, said apparatus comprising:
    a fluid pumping device;
    a fluid flow measurement device;
    an unstable heat energy source;
    temperature sensors in the fluid outgoing and the fluid return sides;
    energy input sensors, and
    a computational device executing a program for recording time-stamped temperature, energy input, and flow data, and for performing an analysis of the recorded data; where
    the analysis being performed is a numerical method simulation based on a minimal parameter model that includes the TC(s), the HC(s), fluid pipe sizes, fluid pipe lengths, fluid pipe configuration, and borehole diameters if in a borehole, and which when combined in the numerical method simulation with the recorded energy input and flow data results in the numerical method simulation predicting a thermal response in the form of varying fluid outgoing and incoming temperatures;

the minimal parameter model mathematically depicts a 3 zone ground model including, when present, an inner grout area between the borehole center and the fluid pipe loop, an outer grout area between the fluid pipe loop and the borehole wall, and a set of ground areas surrounding the fluid pipe loop utilizing common formulas relating volume, temperature, energy, thermal conductivity, and heat capacity;

the program correlates the numerical method simulation results to the recorded data computing a degree of accuracy being the root mean square of the difference between the measured temperature data and the predicted temperature data from the numerical method simulation, and determines a best fit solution for the TC and HC parameters such that the simulation results match the time-stamped temperature and flow data to a user requested minimum degree of accuracy; and the computational device outputs the results of the analysis to the user on request.

2. The apparatus of claim 1 wherein the numerical method simulation is run iteratively as additional data is recorded.

3. The apparatus in claim 1 where the unstable heat source is an integrated electric heating element powered by an unstable electric power source.

4. The apparatus in claim 1 where the unstable heat source is an integrated water heater with a fuel energy source.

5. The apparatus in claim 1 where the unstable heat source is a Combined Heat and Power unit.

6. The apparatus in claim 1 where the fluid flow measurement device is an acoustic send and receive device pair under the computational device control to measure a fluid loop acoustic signal round trip time from the acoustic send device, down the pipe, around the bottom, and up the pipe to the acoustic receive device, and by measuring the same acoustic signal round trip time both during the Thermal Response Test when the fluid pumping device is operating and during a no flow condition before the fluid pumping device starts, the computational device computes the fluid flow rate based on the acoustic signal round trip time differential from the no flow condition and the fluid pipe size, and where the acoustic device is also used in the no flow condition to confirm the installed pipe loop length by calculating the acoustic signal round trip time in conjunction with reference acoustic wave speeds in similar fluid pipe loops.

7. The apparatus in claim 1 where the best fit solution for the TC and HC parameters is a multivariate correlation based on the TC and HC input parameters of the minimal parameter model being iteratively adjusted by the installed program to improve the correlation between the numerical method simulation predicted fluid pipe loop temperatures and the recorded fluid pipe loop temperature data until best fit solutions are found to the user requested minimum accuracy.

8. The apparatus in claim 1 where the analysis is also used to confirm actual installed loop pipe length and configuration by varying the pipe sizes, pipe lengths, and pipe configuration inputs of the minimal parameter model until the difference between the recorded data and the numerical method simulation result is further minimized.

9. The apparatus in claim 1 where said program allows for known variations in ground conditions surrounding said pipe loop.

10. The apparatus in claim 1 where the following process is used to integrate information about variations in rock strata into the minimal parameter model:

halting the heat source and fluid pumping device, pausing for fluid temperatures in the loop pipe to stabilize at the surrounding local ground temperature by thermal conductivity, restarting the fluid pumping device, rapidly recording temperature data for the first ½ loop's fluid, integrating measured temperature variation information into the minimal parameter model by adding vertically different TC zones each with their own minimal parameter model for the numerical method simulation, and restarting the heat source and fluid pumping device.

11. The apparatus in claim 1 where the TC and HC of grout, when present, is also determined by modeling an inner grout area and an outer grout area as two thermal zones.

12. The apparatus in claim 1 where a minimum possible time and cost Thermal Response Test is provided by terminating the heat source and fluid pumping device once the numerical method simulation and actual recorded data correlate to the user requested minimum degree of accuracy.

13. The apparatus in claim 12 where the operator is notified of the test termination.

14. The apparatus in claim 12 where the requested degree of accuracy is that the root mean square of the difference between the recorded temperature data and the numerical method simulation predicted loop pipe temperatures is less than 0.01° F.

15. A process for conducting a Thermal Response Test (TRT) to accurately determine Thermal Conductivity (TC) and Heat Capacity (HC) of Ground, and of Grout if present, using an installed Geothermal Heat Pump fluid loop field (the fluid loop) and a circulating pump, an unstable thermal energy source affecting the fluid loop, temperature sensors in both the outgoing and returning fluid loop pipes, a fluid flow meter, a computational device executing a program for recording time-stamped temperature and flow data (the recorded data), and for performing an analysis of the recorded data, including the steps of:

building a mathematical model of the pipe size, configuration, and length, borehole diameters if present, and TC and HC of the Ground, and Grout if present, being tested;

enabling the circulating pump and the unstable thermal energy source affecting the fluid loop;

recording time-stamped data including outgoing and returning fluid loop temperatures, flow rates of the fluid, and where possible heat flux inputs provided by the unstable thermal energy source;

computing a thermal energy input into the fluid loop from the unstable thermal source based on the temperature gain from the recorded temperature data and the flow data using basic heat gain formulas, including as accuracy improving support any heat flux inputs directly recorded from the unstable thermal source;

performing a time-stepping simulation using the mathematical model resulting in a set of predicted outgoing and returning pipe loop temperatures and comparing the mathematical model predicted outgoing and returning fluid loop temperatures to the recorded outgoing and returning fluid loop temperatures;

varying the TC and HC parameters and repeating the previous step until a user requested minimum degree of accuracy fit between the simulation result and the time-stamped data is achieved; and reporting the resulting parameters where the model includes inputs for loop pipe sizes, loop pipe lengths, loop pipe configuration, and borehole diameters if in a borehole;

the model does not depend on the quality of thermal energy being supplied by the unstable heat source;

the model contains no more than one thermal zone each of grout inside and outside the loop if grout is present, one or more thermal zones for ground extending outward from the pipe, and one thermal conduction path between each adjacent thermal zone; and the time-stepping simulation is run on the computational device.

16. The process in claim 15 where a minimum testing time is determined by the ordered steps of:

collecting a new time-stamped data point;

determining a new best fit solution for all TC and HC parameters using collected data points;

determining the accuracy of the correlation between loop temperatures predicted by the new best fit modeled solution and the actual thermal data collected; and repeating all the above steps until a minimum time has passed and the accuracy of the correlation meets or exceeds that requested by the user.

17. The process in claim 16 where the accuracy of the correlation is computed as the root mean square of the difference between the measured temperature data and the loop temperatures predicted by the simulation and is less than 0.01° F.

18. The process in claim 15 where the heat flux input being supplied is varying and intermittent.

19. The process in claim 15 where the model is periodically refined to integrate information about variations in ground rock strata by the steps of:

halting the heat flux input and fluid loop pumping;

briefly pausing for fluid temperatures in the loop pipe to stabilize at their local ground temperature by thermal conductivity;

restarting the pump;

rapidly measuring and recording fluid loop incoming temperature data for the first ½ loop's fluid;

integrating any measured temperature variation into the model by dividing the ground into additional thermal zones representing a portion of the overall loop pipe length each with their own TC and HC determined by variations between the measured temperature data and that predicted by previous versions of the model; and restarting the regular testing process with the now enhanced ground thermal zone model.

* * * * *